Patented Jan. 30, 1934

1,945,182

UNITED STATES PATENT OFFICE

1,945,182

PURIFICATION OF CRUDE COUMARIN

Erik Clemmensen, St. Louis, Mo., assignor, by mesne assignments, to Monsanto Chemical Company, a corporation of Delaware No Drawing. Application September 2, 1930 Serial No. 479,425

9 Claims. (Cl. 260—54)

This invention relates to the manufacture of courmarin and it has particular application to the refining or purification of crude coumarin whereby the unreacted raw materials as well as by-products may be removed completely, resulting in a product of high degree of purity.

It is a well known fact that crude coumarin regardless of its source is very difficult to isolate free of various impurities, particularly those which are slightly volatile, such as, the phenols, salicylaldehyde and others. According to the present invention advantage is taken of the reaction between coumarin and sulfites or bisulfites whereby water soluble, non-volatile, stable addition products are formed. The aqueous solution of such addition products can be boiled, extracted by various solvents and heated with mineral acids below certain maximum temperatures without liberating coumarin. The aqueous solution containing the sulfite reaction product of the crude coumarin may be filtered to remove insoluble matter and thereafter freed from soluble impurities by steam or vacuum distillation or by extraction with an organic solvent. In this way one obtains a solution which contains the combined coumarin, but none of the various difficultly separable impurities present in the crude material. The coumarin is liberated by adding a mineral acid and heating until all of the sulfur dioxide is evolved. The product so obtained is washed free of acid and decolorized by simple crystallization or vacuum distillation.

Coumarin is employed extensively either alone or in combination with other aromatics as a flavor and as an ingredient of perfumes. For these purposes, it is essential that it contain no foreign odor or taste, such as may be imparted by various impurities, raw materials and by-products. Of these phenols, salicylaldehyde and chlorinated impurities are both characteristic and highly objectionable. Thus for example, only a trace of any of these materials can be detected in the aroma of coumarin and renders it unsatisfactory. Because of the fact that these impurities have, for the most part, physical properties as well as chemical properties which do not permit of separation without exhaustive refining treatment, the losses incurred by present day processes are substantial and the cost of refining represents a sizable fraction of the total cost of the product.

It is one object of this invention to provide a method for refining coumarin by which the insoluble as well as volatile impurities may be separated completely and conveniently.

It is a further object of the invention to provide an inexpensive method of refining coumarin by which the losses of coumarin incident to the present processes for refining the crude coumarin are reduced substantially, and by which a substantial increase in the yield of refined coumarin may be had.

Coumarin is manufactured by various methods. One such method—the Perkins synthesis—involves the reaction of salicylaldehyde with acetic anhydride. Another process—the Raschig synthesis—consists in chlorinating a cresol ester, such as tri cresyl phosphate, and subsequently causing the product to react with sodium acetate. Another process wherein salicylaldehyde is employed as the starting material—the Haarmann-Reimer synthesis—involves the interaction of salicylaldehyde and cyanacetic acid followed by the splitting off of carbonic acid. All of these processes result in the formation of varying amounts of tars, resins, and the crude product will contain other impurities including unreacted raw materials. Heretofore, the refining operation has entailed careful fractionation or crystallization. However, in view of the fact that many of the impurities are volatile such a procedure necessitates careful supervision of repeated refining operations, which in turn results in losses of product either by reason of decomposition or mechanical losses such as are incident to the handling of the product.

The disadvantages of this prior practice are overcome by the present invention as will be apparent from the following example: 100 parts of crude coumarin are heated with a solution of 100 parts sodium bisulfite in 300 parts of water. The coumarin combines with the bisulfite and is fixed thereby forming a stable, non-volatile, soluble compound. After the formation of the coumarin-sulfite reaction product is complete, the solution is filtered preferably when cold to remove any resins, tars or other undissolved matter and the filtrate is concentrated by boiling until the temperature reaches about 110° C. Impurities such as salicylaldehyde, phenols, sulfur dioxide as well as others are thereby volatilized. Remaining traces of volatile impurities, if any, may be removed conveniently by steam distillation, while maintaining the temperature at approximately 110° C. until a prefectly odorless solution remains.

The solution so obtained is cooled and mixed with 100 parts concentrated sulfuric acid. The temperature is then gradually increased to about 125° C. during which time sulfur dioxide is evolved which may be recovered and used with soda ash in the sulfite treatment of a subsequent charge of crude coumarin. After the evolution of sulfur dioxide is no longer perceptible, the solution is diluted and cooled. The coumarin which is precipitated is washed free of sulfuric acid and will be found to have no foreign odors.

By crystallization or, preferably, vacuum or steam distillation, one is able to obtain a perfectly colorless product from the washed coumarin.

Obviously other temperatures may be employed as well as other proportions of reagents. Similarly, other sulfites, or bisulfites which are soluble, will be found to react with the coumarin to form addition products, suitable for the purpose of this invention. If desired, one may pass sulfur dioxide into an alkaline solution containing the crude coumarin within the spirit of this invention. It will be apparent, therefore, that numerous modifications of the invention may be employed in which the feature of fixing the coumarin by means of a sulfite after which the volatile constituents are separated by distillation or by means of organic solvents is common to all.

Attention is drawn to my co-pending application, Serial Number 679,761, filed July 10, 1933, wherein the step of extracting impurities from the aqueous solution of the inorganic sulphite addition product of coumarin is specifically claimed.

What I claim is:

1. The step in the purification of crude coumarin which comprises causing the coumarin to react with an inorganic sulfite reagent whereby the coumarin is rendered non-volatile, steam distilling the mixture and finally regenerating the coumarin.

2. In the purification of crude coumarin, the steps which include treating the coumarin with sodium bisulfite in an aqueous medium, separating the volatile impurities and finally regenerating the coumarin.

3. In the purification of crude coumarin containing volatile impurities, the step which consists in combining the coumarin with an inorganic sulfite, thereafter removing the volatile impurities and finally regenerating the coumarin by means of a strong mineral acid.

4. In the purification of crude coumarin containing volatile organic impurities, the step which includes reacting the coumarin with an inorganic sulfite in an aqueous medium, separating the organic impurities, and finally treating the aqueous solution with strong mineral acid whereby the coumarin is regenerated with the evolution of sulfur dioxide, and finally distilling the coumarin regenerated.

5. In the purification of crude coumarin, the steps which comprise forming a derivative of coumarin which is substantially non-volatile under the conditions of the subsequent steps of purification by causing the coumarin to react with an inorganic sulfite reagent, subsequently separating the volatile impurities present in the crude coumarin, and thereafter liberating the coumarin and distilling the liberated product.

6. In the purification of coumarin, the steps which include forming the water soluble, inorganic sulfite addition product of coumarin, separating the volatile impurities, and finally regenerating the coumarin.

7. In the purification of coumarin, the steps which include forming the water soluble, inorganic sulfite coumarin addition product, separating the water insoluble fraction from the aqueous solution containing the coumarin addition product, removing the volatile organic impurities from the solution and subsequently liberating the coumarin.

8. In the manufacture of coumarin, the steps in the purification of the coumarin which include forming an aqueous solution of the inorganic sulfite addition product of coumarin, separating the insoluble fraction from the solution, distilling the solution whereby the volatile impurities are eliminated, and subsequently regenerating the coumarin.

9. The method as defined in claim 8 and further characterized in that the distillation is effected until the temperature reaches approximately 110° C. and a practically odor-free solution is produced, subsequently regenerating the coumarin by the addition of a strong mineral acid whereby sulfur dioxide is liberated and evolved, separating the coumarin from the aqueous fraction and finally distilling the same.

ERIK CLEMMENSEN.